Aug. 29, 1961     W. E. STODDART ET AL     2,998,351
PROCESS FOR THE CONTINUOUS MALTING OF GRAIN
Filed Aug. 19, 1959     4 Sheets-Sheet 1
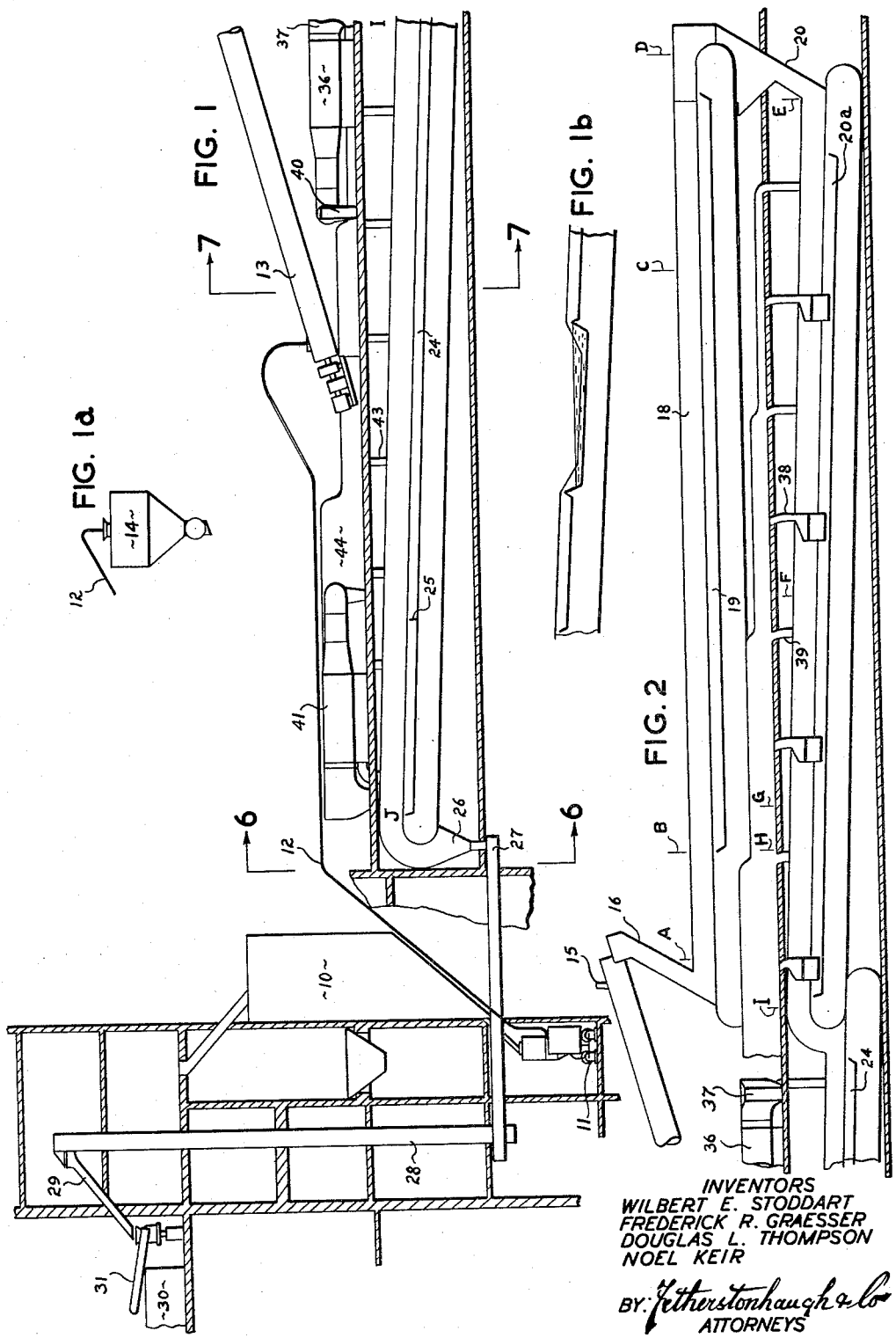
INVENTORS
WILBERT E. STODDART
FREDERICK R. GRAESSER
DOUGLAS L. THOMPSON
NOEL KEIR
BY: Fetherstonhaugh & Co
ATTORNEYS Aug. 29, 1961 W. E. STODDART ET AL 2,998,351
PROCESS FOR THE CONTINUOUS MALTING OF GRAIN
Filed Aug. 19, 1959 4 Sheets-Sheet 2
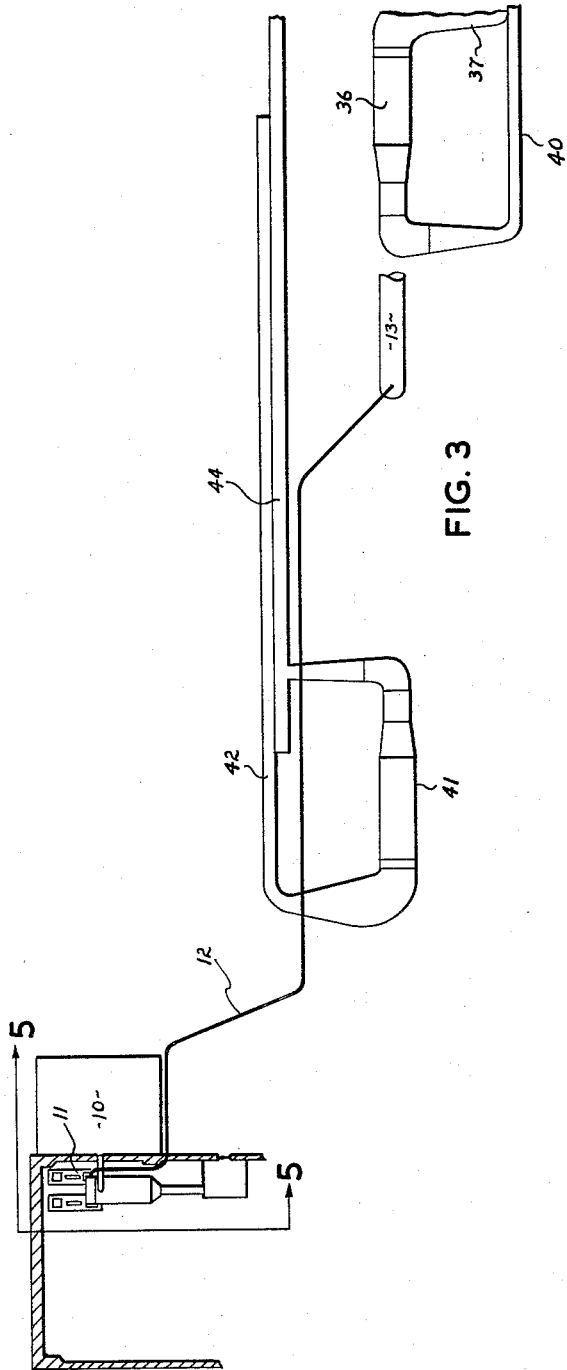
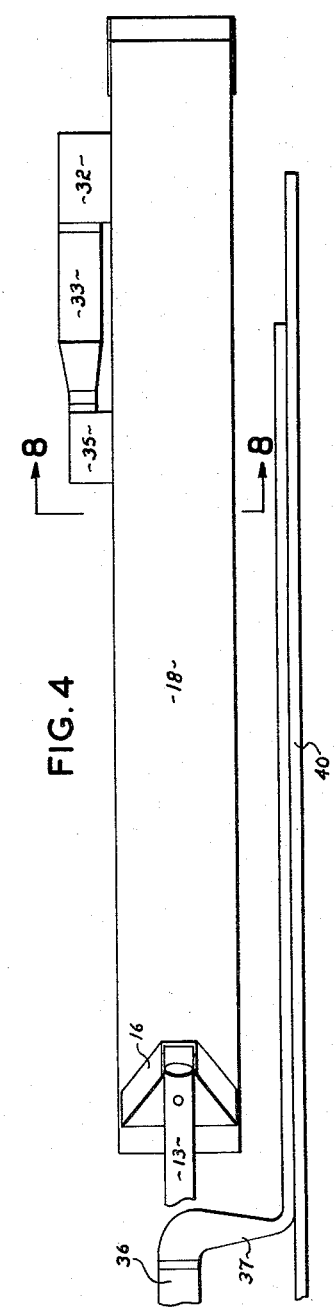
INVENTORS
WILBERT E. STODDART
FREDERICK R. GRAESSER
DOUGLAS L. THOMPSON
NOEL KEIR
BY: Featherstonhaugh & Co
ATTORNEYS

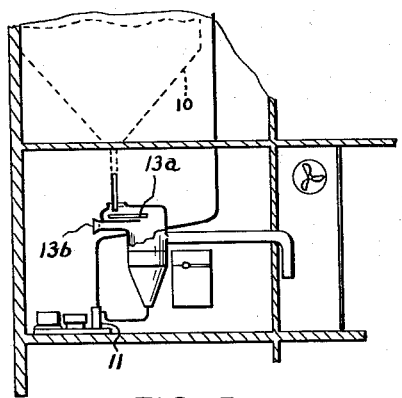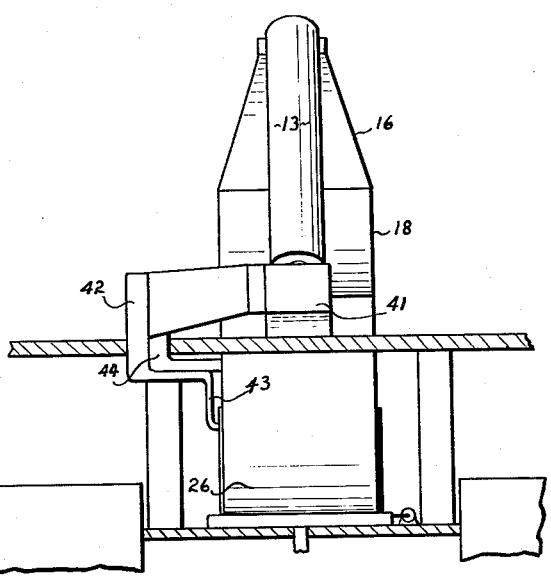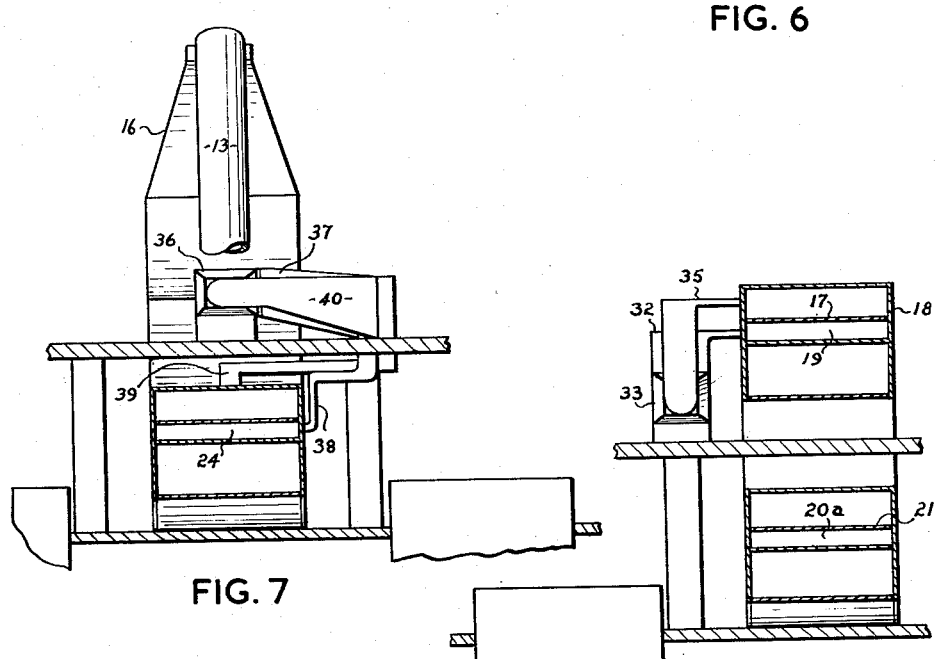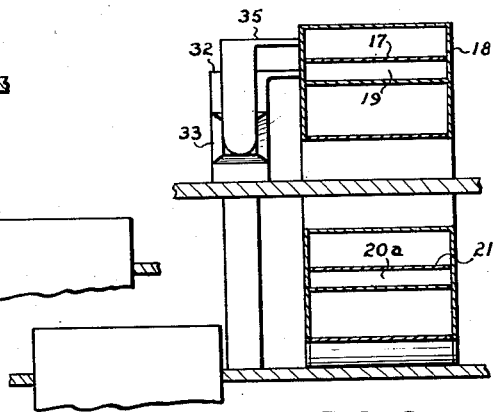
FIG. 5
FIG. 6
FIG. 7
FIG. 8
INVENTORS
WILBERT E. STODDART
FREDERICK R. GRAESSER
DOUGLAS L. THOMPSON
NOEL KEIR
BY: Fetherstonhaugh & Co
ATTORNEYS Aug. 29, 1961  W. E. STODDART ET AL  2,998,351
PROCESS FOR THE CONTINUOUS MALTING OF GRAIN
Filed Aug. 19, 1959  4 Sheets-Sheet 4
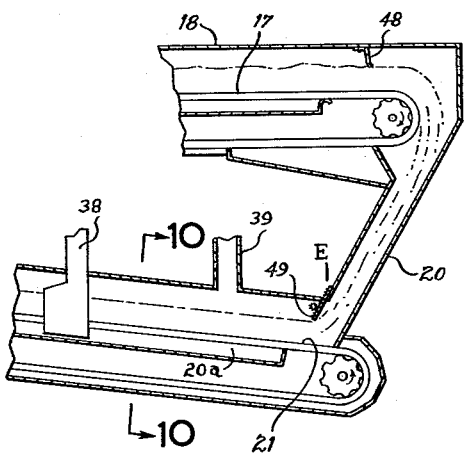
FIG. 9
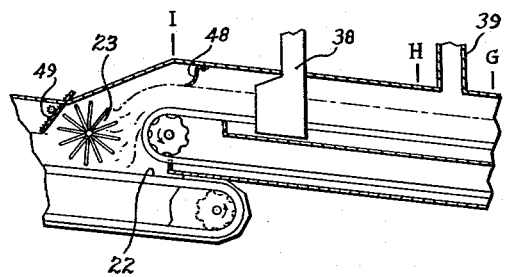
FIG. 10
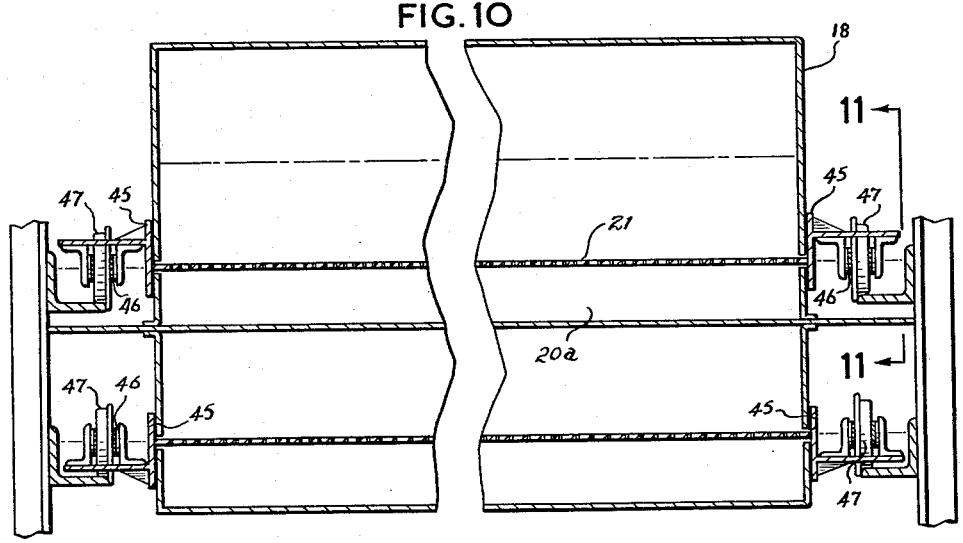
FIG. 11
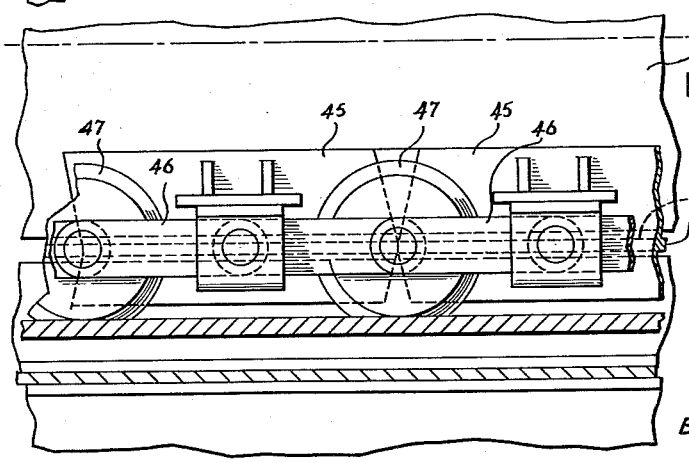
INVENTORS
WILBERT E. STODDART
FREDERICK R. GRAESSER
DOUGLAS L. THOMPSON
NOEL KEIR
BY Featherstonhaugh & Co.
ATTORNEYS

United States Patent Office 2,998,351
Patented Aug. 29, 1961

2,998,351
PROCESS FOR THE CONTINUOUS MALTING
OF GRAIN
Wilbert E. Stoddart, Willowdale, Ontario, Frederick
Richard Graesser, Toronto, Ontario, Douglas L.
Thompson, Birnhaven, Ontario, and Noel Keir, Don
Mills, Ontario, Canada, assignors to Dominion Malting (Ontario) Limited, Toronto, Ontario, Canada
Filed Aug. 19, 1959, Ser. No. 834,805
Claims priority, application Great Britain Aug. 28, 1958
9 Claims. (Cl. 195—71)

This invention relates to a process for the continuous malting of grain.

Malting is an old well recognized art, and the generally accepted practice has been to immerse and thus steep the grain in a steep liquor in preliminary stages of processing as to initiate germination. This general practice has two primary disadvantages. On the one hand, the steeped liquor extracts growth inhibitors and contaminants which are then left in intimate contact with the grain during the steeping period. On the other hand, it is not possible to aerate the liquor sufficiently to eliminate the possibility of oxygen depletion, with the result that the grain may be caused to respire anaerobically, thus producing as a by-product of such respiration certain alcohols and organic acids recognized as growth inhibitors.

In more recent years, spray moistening has been proposed and this tends to overcome the disadvantages of the initial steep by immersion as above outlined. However, spray moistening has been carried out in batch process and is usually interrupted by immersion accompanied by turbulence for aeration, and involves a complication of intermittent processing steps which require a time period substantially similar to the long time period required with the first mentioned mode of processing. According to both types of processing, malting requires approximately ten days and more.

The present invention avoids most of the disadvantages of the prior art and provides for simple continuous processing through which not only complication is avoided but the processing may be reduced to a period of three days or less in comparison with approximately ten days or more, and is subject to minute control which has been difficult in prior batch processes. In fact the present continuous process provides for continuous processing through stages or zones maintaining constant conditions, varied as to one another, according to requirements necessary in regard to the character of the grain, and through which the grain continuously passes in effect to provide the continuous yield of a substantially uniform malt. Moreover, other attendant advantages result as labour required per unit of production will be reduced, resulting in greater economy, the weight and strength of complete equipment will be reduced and initial costs of buildings thus lessened; whereas the process provides for an extremely wide range of control as to time and processing, moisture content and temperature gradient, so that the conditions of manufacture may be adapted to the quality and type of grain being processed as to provide for the production of malt of superior quality and of generally uniform character in which all factors of production have been closely controlled throughout.

The invention generally embodies the steps of continuously forming and moving a bed of grain in a predetermined path, subjecting said moving grain bed to intermittent periods of water spray and periods of rest and periods of humid aeration at temperatures between 50 and 100° F., and finally moving said bed through a drying zone at elevated temperatures. Preferably the processing includes in said steps a period of drenching the bed followed by dry aeration. The grain may be introduced to the processing steps in any suitable manner, such as by pumping it together with water to the point of preliminary processing, which may start with the dispersing of the grain in water, and allowing the sound grain to settle, while the lighter grain and low gravity extraneous material may be continuously removed from the surface of the water body in which it is dispersed and delivered to a suitable recovery unit.

The invention will be fully understood by reference to the following detailed specification taken in conjunction with the accompanying drawings, which schematically illustrate apparatus through which the process may be conveniently carried out.

FIGURE 1 is a schematic side elevation of apparatus for carrying out stages of the processing and which apparatus is broken away to its right-hand side;

FIGURE 1a is a schematic illustration of a wetting and cleaning tank;

FIGURE 1b is a schematic illustration of an immersing tank through which the grain may be passed;

FIGURE 2 is a continuation of the apparatus shown in FIGURE 1 broken away at its left-hand side as to fit with the broken terminus of FIGURE 1;

FIGURE 3 is a schematic plan view showing the preliminary grain feed and the duct system for aerating and conditioning the grain, which view is broken away at the right-hand end thereof;

FIGURE 4 is a continuation of FIGURE 3 showing the duct system in plan view;

FIGURE 5 is a schematic section taken along the line 5—5 of FIGURE 3;

FIGURE 6 is a schematic section taken along the line 6—6 of FIGURE 1;

FIGURE 7 is a section taken along the line 7—7 of FIGURE 3;

FIGURE 8 is a schematic section taken along the line 8—8 of FIGURE 4;

FIGURE 9 is a longitudinal section taken through part of FIGURES 1 and 2 to illustrate the lapping arrangement of the moving beds of material;

FIGURE 10 is a cross section of the apparatus taken along the line 10—10 of FIGURE 9; and FIGURE 11 is a fragmentary detail elevation of the side wall of the casing viewed as in the direction of the arrows 11—11 of FIGURE 10.

According to the invention, the grain to be malted is fed continuously from the garner as by hopper 10 to the processing apparatus employed, in any suitable manner, here shown by means of pumping apparatus 11 which operates to pump, through the feed conduit 12, a mixture of grain and water to the conveyor contained in conveyor duct 13. For feeding the mixture of grain and water to the conveyor 13, the grain may be delivered, as shown in FIGURE 5, to a vibrator 13a, cleaned with air through the air inlet 13b and delivered to the pump 11 through to the feed line 12. Alternatively, if desired, an intermediary may be employed between the conveyor duct 13 and the feed line 12, as shown in FIGURE 1a, viz. discharging the feeding grain into a receiving vessel 14 partially filled with constant temperature water and in which the grain is dispersed in suitable manner, such as by a revolving cone spreader or other suitable means, such as by agitating the water with air. In this manner, the sound grain may be caused to settle to the bottom, while the lighter grain and low gravity extraneous material may be continuously removed from the surface of the water in the vessel and channeled to a suitable recovery unit.

The conveyor in conveyor duct 13 is preferably a screw conveyor, the blades of which are provided with perforations sufficient for water passage and preferably including blades thereon to lift the grain intermittently and therefore agitate it. Other means, however, could be employed, such as an open screen paddle conveyor. The grain is carried, as here shown, by the conveyor in upwardly inclined duct 13 and in a countercurrent water flow, which may be introduced through a water entry port 15 adjacent the upper end thereof or supplied by means of sprays arranged through pipes disposed in the upper side of the duct. The water so introduced to the conveyor duct is at a temperature in the range of 50° to 100° F. and preferably at approximately 65° F. The grain so conveyed is, therefore, subjected to wetting and a thorough rinsing by water flowing in countercurrent relation over a period of approximately two hours as it passes from the base of the conveyor to the point of discharge at the upper end of the conveyor duct 13 and achieves a moisture content of the order of 32 to 35%. The grain, in the first instance, therefore, is thus given a maximum rinsing effect, deterging undesirable materials therefrom and which may have been previously loosened in the receiving tank 14 (if employed). The countercurrent water is discharged through perforations, ports or the like in the base of the conveyor duct to a suitable sump to be diverted to waste or recirculated, as may be desired.

The grain is discharged from the end of the conveyor duct in well washed, wetted and aerated condition into the discharge duct 16 and is uniformly spread by suitable means to a desired depth onto a travelling foraminous table 17 (FIGURE 9) contained within the casing 18. This foraminous table may be made up of any suitable material, preferably metal, and may be constituted by a series of connected foraminous plates referred to more fully hereinafter. This table is designed to be operated through conventional variable speed driving mechanism at a speed between two and ten feet per hour and preferably approximating the rate of four feet per hour, for processing of the grain over the desired time period.

In the initial stage of travel on conveyor 17 through the zone denoted between the lines A—B (FIGURE 1), a travel period of between four and five hours, it is subjected to water spray preferably at a temperature between 50° and 100° F., depending upon the character of the grain, and without aeration. We prefer to spray in this stage at a temperature between 65° and 70° F. to obtain optimum results. At the lower end of the range the time period must be lengthened somewhat, and at the upper end vigorous grain kernels will germinate rapidly, while older kernels would tend to die.

The grain passing to the second zone, i.e. substantially between the lines B and C, is subjected to a period of rest of approximately twelve hours and is aerated from a plenum chamber 19 supplied with air under pressure by a suitable duct system which will be generally referred to hereinafter. In the zone B—C, air is supplied at a desired rate and at a temperature of approximately 65° F. and at a relative humidity of approximately 100%. This permits the grain to sprout and to rupture the seed coating or semi-permeable membrane, thus permitting ingress of both water and oxygen necessary to promote growth and development. This period of aeration and rest renders the grain readily able to absorb the necessary moisture. Within this zone the layer of grain is preferably turned over to separate and free the grain and thus loosen the bed. In this zone visible growth occurs and white chits start to show. Upon passing through zone C—D during a period of seven to eight hours, the grain is subjected to aeration and intermittent spray at temperatures in the neighbourhood of 65° F. so that as the grain discharges from zone C—D, it has attained a moisture content of approximately 40–42%. At this point the rootlets or radicles are starting to form.

It will be understood that the sprays employed are of a number requisite completely to cover the full width of the bed of grain therebelow and aeration where employed may be effected either by a positive or negative pressure, the air being suitably conditioned for the function desired, and is washed and humidified substantially to the saturation point. The air passing through the bed of moving grain will have the effect of purging therefrom any gaseous formations and supplying the air necessary to support biological activity in the grain, while also acting in effect to control the temperature within the predetermined range required. Ample air is supplied to provide sufficient free oxygen to support the biochemical activity associated with growth phenomena and to prevent any tendency towards oxygen limitation which causes plants to respire anaerobically, producing as a by-product of such anaerobic respiration certain alcohols and organic acids recognized as growth inhibitors. Thus, during this wet germination phase, the various biochemical reactions incident to respiration and growth are encouraged and at no time inhibited through lack of an adequate supply of air.

From the zone C—D, the grain is discharged through a suitable enclosed chute 20 onto a second foraminous travelling table 21 (FIGURE 9). In discharging through the chute 20, which is arranged to provide for a substantial drop, the grain layer tends to break up and cascade as to cause the layer to reorient and re-form on the lower travelling table 21. In the zone E—F, it is caused to travel therethrough over a period of approximately fourteen hours and is subjected to intermittent intervals of spray and to aeration with air from plenum 20a at approximately 58° F. and a relative humidity average of approximately 100%, the intermittent spray being preferably carried out at a water temperature of approximately 65° F. In this zone the shoot or acrospire (plumule) will start to swell visibly. Preferably, before the grain layer passes from zone F—F to F—G, the grain is again roused, i.e. lifted and turned by suitable means with a view to eliminating any matting tendencies.

The grain continues through zone F—G over a period of approximately four hours where it is subjected to a complete period of rest without aeration and without spray, having the effect of causing the grain to respire with increasing intensity, thus conditioning it for a subsequent phase of wetting. The grain then passes through zone G—H of the table during a period of approximately one hour, where it is subjected to drenching, i.e. either a solid spray throughout the zone with water at a temperature of approximately 80° F., or, alternatively, it is subjected to total immersion in an immersing vessel, such as indicated in FIGURE 1b, and which has the effect of assuring maximum penetration of moisture and, therefore, aids in the desired internal migration of enzymes and their products as to release for later recovery the maximum amount of desired extractable materials and which also has the undesirable effect of promoting excessive resynthesis of new growth, which latter must be controlled. This may be accomplished by certain known chemical additives possessing growth inhibiting capacities, but we prefer to achieve this by a continuing aerating step of the process since it is subject to control in this way and avoids any psychological public aversion to use of chemicals in the treatment of foodstuffs.

The grain bed then traverses through the zone H—I over a period of approximately four hours where it is subjected to rest from spray and is traversed by dry air at approximately 52° F. and at an excessive rate, which may be of the order of 20 cubic feet per bushel per minute. The constant soaking spray or immersion as carried out in zone G—H, followed by the dry aeration in zone H—I, acts to control root growth, preventing excessive rootlet or radicle formation which would result in consequent high malting loss upon dehydration.

As the dry aeration is completed in zone H—I, the bed passes on through zone I—J. At this point in the apparatus here shown, the grain passes from the end of travelling table 21 and is caused to cascade onto the travelling table 22. This provides for a further turning over of the grain, which may be assisted by a mechanical agitator 23 disposed within the casing substantially in the path of flow of the grain from table 21 to table 22.

In the zone I—J, the moving grain bed is subjected to aeration variable in quantity up to a rate of 20 cubic feet per bushel per minute in a temperature range selected to control effectively growth and development, as to achieve the optimum in these factors within a reasonable time limit. During this phase, should the grain show evidence of drying, a small quantity of water may be added through sprays or sprinklers sufficient to maintain a moisture content approximating 45 to 50%.

The processing in this zone is carried out over a period of approximately twenty-one hours and preferably the plenum chamber 24, which supplies air to the zone I—J, is divided in suitable manner, as schematically illustrated at 25, FIGURE 1, so that a separate aeration section may be employed for the last eight hours whereby variation may be made in aeration as may be required to bring the grain to the condition desired for drying. As the grain bed moves from the zone I—J, it is cascaded, as here shown, through the chute 26 and conveyed through the conveyor duct 27 in any suitable conveyor to the elevator 28, from which it is discharged by way of the chute 29 to a foraminous moving table 30 upon which it is suitably spread to required depth in any suitable manner such as by the swing belt loader 31.

The table 30 is designed to be enclosed in a casing, which may be composed of one or more chambers and is subjected to air circulation for drying purposes at varying temperatures. In this instance, the grain bed is carried through this drying zone during a period of approximately eight hours, when it is subjected to a program schedule of temperature increases starting preferably at approximately 120° F. and attaining a final temperature such as to promote adequate curing of the grain, giving rise to the characteristic flavour and aroma associated therewith, the final temperature being determined by the degree to which it is desirable to develop the aforesaid characteristics (flavour and aroma). This, for normal brewing malts, would require a final curing temperature ranging from 170° F. to 220° F. During this programmed schedule of temperatures, air of varying volumes and velocities is passed through the bed, normally large volumes at high velocity are passed therethrough during the initial stage, and as the temperature increases the volume normally reduces in substantially inverse ratio.

At the time of discharge from the drying zone, the grain will have been subjected to continuous processing of the order of seventy-six hours. Depending on the type of grain and its character, taking into consideration the variables provided for in process control, this period may be substantially lower or higher. The example given is indicative of the very substantial saving in time as compared with conventional batch processing, a comparison of approximately three days in the case of the present invention as compared to ten days or more in the case of such prior processes. Moreover, due to the continuous processing through stages or zones maintaining constant conditions varied as to one another according to requirements necessary in regard to the character of the grain, and through which the grain continuously passes, it will be realized that a substantially uniform malt can be achieved and the conditions of manufacture when adapted to the quality and type of grain processed will provide for the production of malt of superior quality as well as of generally uniform character due to the close continuous control maintained throughout.

The process of the invention may be carried out in apparatus differently designed to that schematically illustrated in the present application for the purpose of illustrating the various stages and conditions which pertain throughout the process. The continuously moving bed of grain in the present illustration is carried over three travelling tables arranged in vertically spaced and grouped relation. Obviously, the travelling bed could be arranged in one continuous line if desired. Moreover, as many travelling tables as desired may be employed and arranged to suit available space. It will be understood also that notwithstanding the number and arrangement of such travelling tables, the travelling bed of grain constitutes a continuous moving bed.

In the schematic apparatus shown, it will be noted that the air to the plenum chambers is supplied by means of a circulatory air duct system which, as illustrated, may be provided in a plurality of units, one supplying the plenum chamber 19, one supplying the plenum chamber 20a, and the other the plenum chamber 24. In FIGURE 4, it will be noted that the duct 32 is supplied with air from the fan chamber 33 to the plenum chamber 19, and air is withdrawn from the chamber by means of the duct 35. The air may be washed in the fan chamber 33 and any known means is used for controlling its temperature. As shown in FIGURES 1 and 3, the fan chamber 36 supplies air through the duct 37 (FIGURE 3) through any number of feeding ducts 38 (FIGURE 2) to the plenum 20a, air being withdrawn therefrom by any number of return ducts 39 into the main return duct 40 (FIGURE 3).

In the case of the plenum chamber 24, air is supplied from the fan chamber 41 (FIGURE 3) through the feed duct 42 by means of any number of feeding ducts 43 and returned through the duct 44. As shown in FIGURES 9, 10 and 11, a sealing means is employed of any suitable character.

In the case of the travelling beds, side sealing may be achieved by a series of thin lapping plates 45 to overlap a side wall of the casing enclosing the beds and which connect with the conveyor chain 46, which may be supported on suitable rollers 47.

A suitable seal, such as 48 (FIGURE 9), may be employed in the form of a flexible apron which will ride on the grain layer. Moreover, it should also be noted that provision is made to control the level of the grain layer as by the adjustable gate 49 (FIGURE 9), and levellers of this or similar kind may be employed at different points in the path of travel of the grain bed.

As been indicated, the apparatus for carrying out the process may obviously be varied and the illustrations herein made are for the purpose of illustrating schematically an operable combination. Thus, the apparatus is designed to be suitably sealed as to cause most of the air to pass through the grain, preferably in an upward direction. The high velocity air is provided by conventional type pumps or fans. Heating thereof may be effected by any conventional direct or indirect means, while for greater efficiency the air may be compounded by re-cycling. Preferably, a cold air area is provided where cold air is passed through the grain to terminate curing and to condition it for storage, and at the end of the drying phase the finished material is discharged and continuously removed by conventional conveyor means to an accumulator garner.

It will be clear from the foregoing that the invention provides a continuous operating process involving four general stages, viz. (1) washing and wetting, (2) wet germination, (3) moist or conditioned germination, and (4) drying and curing, wherein all steps in effect merge and follow one another in one continuous operation and wherein a wide range of control over the duration of the process is achieved in respect of temperature and humidity as to adapt the process to the quality and type of grain being processed and a resulting product of superior quality. These results are achieved together with particular economic advantages in reduction of time in processing and labour required, as well as a reduction in the weight and strength of complete equipment needed and its consequent economic advantages.

By use of intermittent spray moistening with alternate rest periods and aeration, an almost immediate visual evidence of growth results, while under the control conditions provided the wetting of the grain by water is coincident with rapid active germination and the intermittent gravity discharge of the grain from one bed formation to another has the result through this cascading effect of gently separating the grains from one another as to avoid interlacing of the root systems.

The depth of grain bed formation is subject to a ready control which may be easily varied, and in the early stages, and again in the later stages, the grain bed layer may normally be much greater because the oxygen demand would be lower at those times, whereas in the highly active intermediate part of the process, the layer may be reduced by accelerating the rate of table travel; and since the tendency of the grain to grow together coincides with the period of maximum speed of growth, it will be apparent that shorter intervals between intermittent gravity discharge would result from increased speed of the travelling table so that the problem of matting is efficiently controlled.

It is obvious that air conditioning may be minutely controlled both in respect of humidity and temperature. The optimum temperature for most grains during washing, wetting and germination appears to be about 68° F., which, through the opportunity of minute control afforded by the process, may be varied by the individual skilled operator in the range of 15° higher or lower. It will be obvious also that under this improved process the operator is no longer subject to processing on a fixed schedule, as is necessary in batch processing, whereas the system as a whole or in part may be slowed down or accelerated to accommodate varietal differences, as well as differences encountered within varieties of grain due to protein content, degree of weathering, and length of storage.

Control in the finishing or kilning (i.e. drying and curing) stage may be arranged to be very sensitive and subject to quick alteration to meet moment to moment conditions, which conditions affecting the drying stage are (1) ambient air temperature and relative humidity, (2) moisture of the material to be dried, (3) the desired moisture, colour, flavour and aroma of the finished product. Any one or all of these conditions can be varied from moment to moment, whereas in the conventional malt kiln used in batch processing, most factors must be predetermined and once set are difficult to alter and, if set incorrectly, large quantities will be affected. Under the present invention of continuous flow drying phase, the speed, depth of grain bed, volume and temperature of air may all be varied, giving variations over a very wide range and providing a very great degree of flexibility.

What we claim as our invention is:

1. A process of malting grain which comprises continuously forming and moving a bed of grain in a predetermined path, subjecting said moving grain to a period of water spray until it attains a moisture content of approximately 32 to 35% (on a wet basis), resting said moving bed from spray for a further period sufficient for the grain to sprout and to rupture the seed coat, and then subjecting said moving bed to a plurality of periods (a) of spraying with water and (b) conditioned aeration so as to attain a moisture content within the range of 40 to 50% (on a wet basis), said periods of treatment being carried out at temperatures between 50 and 100° F. and finally subjecting said moving bed to a period of drying at higher temperatures.

2. A process of malting grain as claimed in claim 1, including subjecting the bed to a period of dry aeration when said grain is in an advanced state of growth.

3. A process of malting grain as claimed in claim 1, including subjecting the bed to a period of drenching when said grain is in an advanced state of growth.

4. A process of malting grain as claimed in claim 1, including the steps of subjecting the bed to a period of drenching when said grain is in an advanced state of growth followed by a period of dry aeration.

5. A process of malting grain as claimed in claim 1, including the preliminary step of subjecting the grain to wetting and washing by a countercurrent water flow as it is continuously fed to said bed, uniformly to expose the grain to the condition of steeping.

6. A process of malting grain which comprises continuously forming and moving a bed of grain in a predetermined path and treating it at temperatures between 50° and 100° F. by subjecting said bed to water spray for a period, in a range up to five hours to attain a moisture content of approximately 32 to 35% (on a wet basis), aerating said bed for a period, in a range up to twelve hours sufficient for the grain to sprout and to rupture the seed coat, intermittently spraying and aerating said bed for a period, in a range up to 22 hours so as to attain a moisture content within the range of 40 to 50% (on a wet basis), causing said bed to rest by relieving it from spray and aeration for a period, in a range up to four hours, subjecting said bed to drenching for a period, in a range up to one hour, subjecting said bed to dry aeration for a period, in a range up to four hours, then subjecting said bed to moist aeration for a period, in a range up to 21 hours to maintain moisture content within the range of approximately 45 to 48% (on a wet basis), and finally drying said moving bed at higher temperatures.

7. In a process of malting grain in which grain is formed into a continuously moving bed and subjected during movement to controlled conditions of temperature moisture and aeration to promote growth, the steps in said continuous processing of preliminarily subjecting the grain to a period of washing and wetting to include deterging it of deleterious materials, and then spraying until the grain reaches a moisture content of approximately 32 to 35% calculated on the wet basis, prior to subjecting said moving bed to a substantial period of rest with conditioned aeration.

8. The steps as claimed in claim 7 in which the washing and wetting is achieved by feeding the grain to the bed in counter-current water flow, uniformly to expose the grain to the condition of steeping.

9. A process of malting grain which comprises continuously forming and moving a bed of grain in a predetermined path and treating it at temperatures between 50° and 100° F. by subjecting said moving bed to a period of water spray until it attains the moisture content of approximately 32% to 35% (on a wet basis) causing said moving bed to rest by relieving it from spray and aeration during a further period, aerating said moving bed for a still further period, intermittently spraying and aerating said bed for a still further period until it attains a moisture content (on a wet basis) of 45% to 50%, then subjecting the bed to a period of drenching, followed by a period of dry aeration, in order to adjust the internal moisture relationships of the kernels, and finally subjecting the bed to a period of variable aeration until a moisture content of approximately 45% to 48% is attained, and then causing the bed to pass through a dry zone at higher temperatures.

References Cited in the file of this patent

UNITED STATES PATENTS

| 2,545,542 | Bodcher et al. | Mar. 20, 1951 |
| 2,676,140 | Kardos | Apr. 20, 1954 |

FOREIGN PATENTS

| 955,585 | Germany | Jan. 3, 1957 |

OTHER REFERENCES

Kirsop et al.: Brewing Industry Research Foundation, vol. 63, 1957, pages 383 to 385.